United States Patent [19]

Kleven et al.

[11] Patent Number: 4,926,695
[45] Date of Patent: May 22, 1990

[54] ROCKING BEAM VORTEX SENSOR

[75] Inventors: Lowell A. Kleven, Eden Prairie; Gary P. Corpron, Chanhassen, both of Minn.

[73] Assignee: Rosemount Inc., Eden Prairie, Minn.

[21] Appl. No.: 96,954

[22] Filed: Sep. 15, 1987

[51] Int. Cl.$^5$ .............................................. G01F 1/32
[52] U.S. Cl. .................................................. 73/861.24
[58] Field of Search ........................ 73/861.24, 861.22

[56] References Cited

U.S. PATENT DOCUMENTS

| | | | |
|---|---|---|---|
| 1,215,135 | 2/1917 | Fisher | 73/861.24 |
| 2,809,520 | 10/1957 | Richard, Jr. | 73/189 |
| 3,459,045 | 8/1969 | Sanford . | |
| 4,033,189 | 7/1977 | Herzl et al. | 73/861.24 |
| 4,123,940 | 11/1978 | Herzl et al. . | |
| 4,171,643 | 10/1979 | Frick . | |
| 4,186,599 | 2/1980 | Frick . | |
| 4,197,739 | 4/1980 | Frick . | |
| 4,226,117 | 10/1980 | Herzl | 73/861.22 |
| 4,262,544 | 4/1981 | Herzl | 73/861.24 |
| 4,307,619 | 12/1981 | Herzl | 73/861.24 |
| 4,339,957 | 0/1982 | Herzl | 73/861.24 |
| 4,464,939 | 8/1984 | Corpron | 73/861.24 |
| 4,475,405 | 10/1984 | Corpron et al. | 73/861.24 |
| 4,545,258 | 10/1985 | Coursolle | 73/861.22 |
| 4,586,388 | 5/1986 | Tanaka et al. | 73/862.58 |
| 4,594,504 | 6/1986 | Coursolle et al. | 250/227 |
| 4,627,295 | 12/1986 | Matsubara et al. | 73/861.24 |
| 4,679,445 | 7/1987 | Knudsen et al. | 73/861.24 |
| 4,791,818 | 12/1988 | Wilde | 73/861.24 |

FOREIGN PATENT DOCUMENTS

0160813 9/1983 Japan .............................. 73/861.24

Primary Examiner—Herbert Goldstein
Attorney, Agent, or Firm—Kinney & Lange

[57] ABSTRACT

A vortex sensor used in a vortex flowmeter that has a single sensing diaphragm parallel to the direction of flow that is sensitive to differential pressures caused by vortices shed by a vortex shedding bar associated with the sensing diaphragm. A beam is attached to the sensing diaphragm and it transfers the deflecting motion of the sensing diaphragm due to differential pressures to a sensor external to the flow passageway. The sensor provides an output indicating motions of the beam caused by the beam pivoting when the sensing diaphragm deflects. The beam preferably is pivoted on a relatively rigid, fluid-tight isolator diaphragm with one end of the beam on the outside of the isolator diaphragm. The sensing diaphragm which is used to measure differential pressure rejects variations in the static pressure, that is, increases and decreases of the static pressure on both sides of the diaphragm, which is a common source of problems with existing vortex flowmeter sensors.

27 Claims, 4 Drawing Sheets

ROCKING BEAM VORTEX SENSOR

BACKGROUND OF THE INVENTION

1. Field of the Invention.

The present invention relates to a vortex flowmeter and more particularly to a sensor for use with a vortex flowmeter utilizing a beam that provides a flow-related output by pivoting or rocking in response to vortex induced differential pressures on a sensing diaphragm.

2. Description of the Prior Art.

Various differential pressure sensitive vortex flowmeters have been advanced which operate on the principle that a bluff body or bar placed in a fluid flow will cause a generation of vortices alternately on opposite sides of the bluff body, causing variations in pressure downstream from the bar. The frequency of vortex shedding is found to be directly proportional to the velocity of flow in the stream for an individual bar configuration characteristic. Twin diaphragm differential pressure sensors used with vortex shedding bluff bodies have been advanced, as shown in U.S. Pat. No. 4,475,405. Deflections of the diaphragm in turn will cause bending of a sensing beam. Twin diaphragm sensors have been found to be sensitive to fluctuations in the static line pressure unless the diaphragms are exactly matched and remain matched under the influence of static pressure. This has practical limitations. Double diaphragm systems with an intermediate fluid fill have been used, but problems with high temperature operation limit performance. Single diaphragms heretofor have been impractical because the use of sensors on a single diaphragm would require exposure of the sensors to the fluid being sensed, and most industrial process fluids will damage sensors.

One measure of the ability of a sensor to reject variations in static pressure is called the common mode rejection ratio. This is defined as the ratio of the sensor output per unit of differential pressure to the output of the sensor per unit of common mode (static) pressure. This ratio should be very large, preferably greater than 2000.

SUMMARY OF THE INVENTION

The present invention relates to a sensor for a vortex flowmeter that has a bluff body or bar in a fluid stream forming vortices on opposite sides thereof, and in particular to a sensor which has a single diaphragm differential pressure sensor located downstream from the bar to sense variations in pressure on opposite sides thereof caused by the shedding of vortices from the bar. The single sensing diaphragm is coupled to a sensing beam that is mounted so that it pivots in the manner of a pivoting lever on a mounting structure which is part of a sealing wall of the flowmeter. A surface on the interior of a chamber will deflect as the sensor beam pivots. The surface is an isolated actuator portion of the beam. This actuator portion then moves from side-to-side during pivoting action of the sensing beam as the single sensing diaphragm moves transversely due to differential pressures acting on it. The motion of the actuating portion on the exterior of the flow stream is sensed in a convenient manner and the frequency of the beam deflections in opposite directions from a reference position indicates the velocity of flow in the flow stream.

The present sensor is particularly adapted for sensing a wide range of flows and is particularly useful for sensing low flows which provide for very low differential pressures. The sensor construction shows a high common mode rejection ratio, that is, it is relatively insensitive to variations in static pressures, but easily senses low vortex generated differential pressures.

The delicate sensing means and electrical connectors are isolated from the process fluid and also sensing means can be calibrated, replaced, and otherwise serviced without shutting down the process line.

Preferably, piezoelectric sensing elements are used as the motion sensing means of the surface actuated by the rocking beam in the fluid flow stream, although other methods or sensing elements are applicable to measure motion of or force generated by the rocking or pivoting sensing beam. Such sensing elements may include strain gauges, optical sensors, magnetic field sensors, or capacitive sensors. Piezoelectric devices are simple, do not require power to operate, and have the ability to detect very small motions, as well as being able to operate at high temperatures.

The sensor can be acceleration compensated, and for high temperature operation only a few high temperature materials are needed, because the sensitive materials are not in direct contact with the fluid being sensed. The sensor location is relatively simple to shield, thus avoiding electrical noise problems. The sensor can be replaced or serviced without line shutdown, because it is non-wetted and no pressurized line seals are opened for service. The number of parts used are minimized, and the diaphragm and other moving components operate at low stress levels to provide long life and reliability. Further, the single diaphragm has the ability to operate over a large dynamic range, and thus sense a wide range of flows. Since the sensor can be manufactured as a one-piece, no-weld assembly, it minimizes corrosion and stress problems.

DETAILED DESCRIPTION OF THE PREFERRED EMBODIMENTS

A vortex shedding flowmeter for providing an output indicative of a flow of fluid is indicated generally at 10. The flowmeter 10 is positioned in a spool 11 forming a section of a flow conduit, and coupled onto a line or pipe 12 which carries a flow of process fluid, the volume of which is to be measured. The fluid flows through a central conduit passageway 13 of the pipe. The spool 11 has a matching or slightly smaller size flow passageway 14, and is coupled to the pipe 12 through the use of a gasket 15 at opposite ends thereof in a normal manner. A flange 16 on pipe 12 can be used for clamping the spool 11 in place utilizing suitable fasteners such as bolts indicated generally at 17 in FIG. 1.

Figure 1:
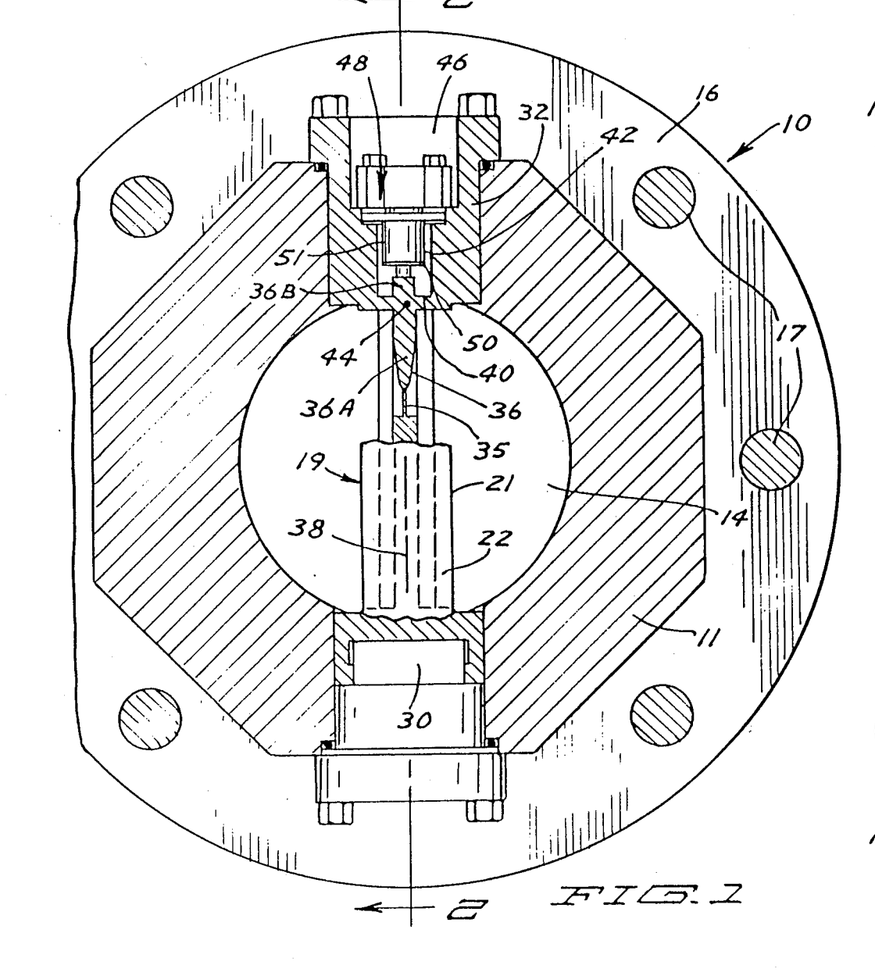
FIG. 1 is a front view of a vortex flowmeter having a sensor made according to the present invention, facing downstream generally along line 1—1 in FIG. 2, with parts in section and parts broken away.
Figure 2:
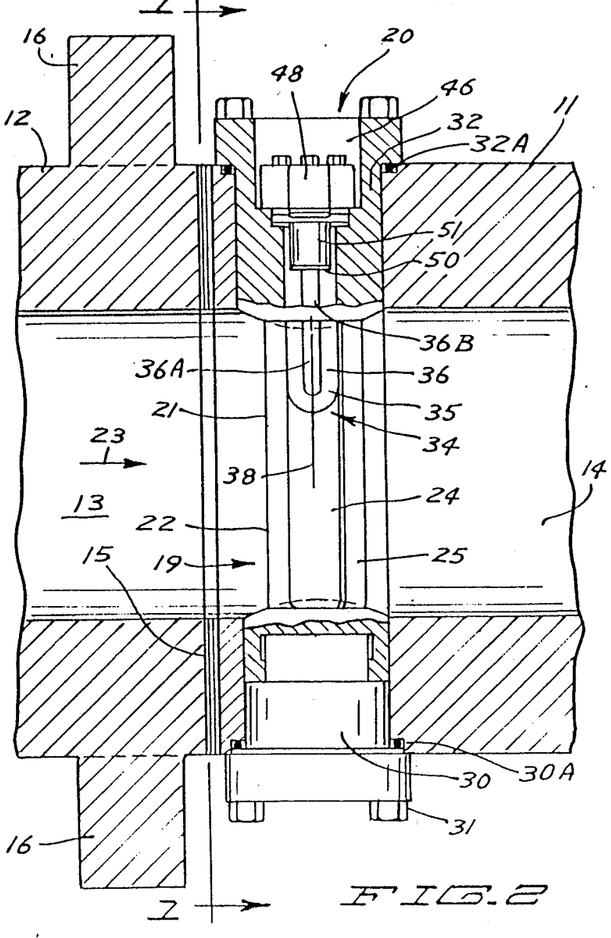
FIG. 2 is a sectional view of a sensor made according to the present invention taken on line 2—2 in FIG. 1.
Figures 3, 4, 5:
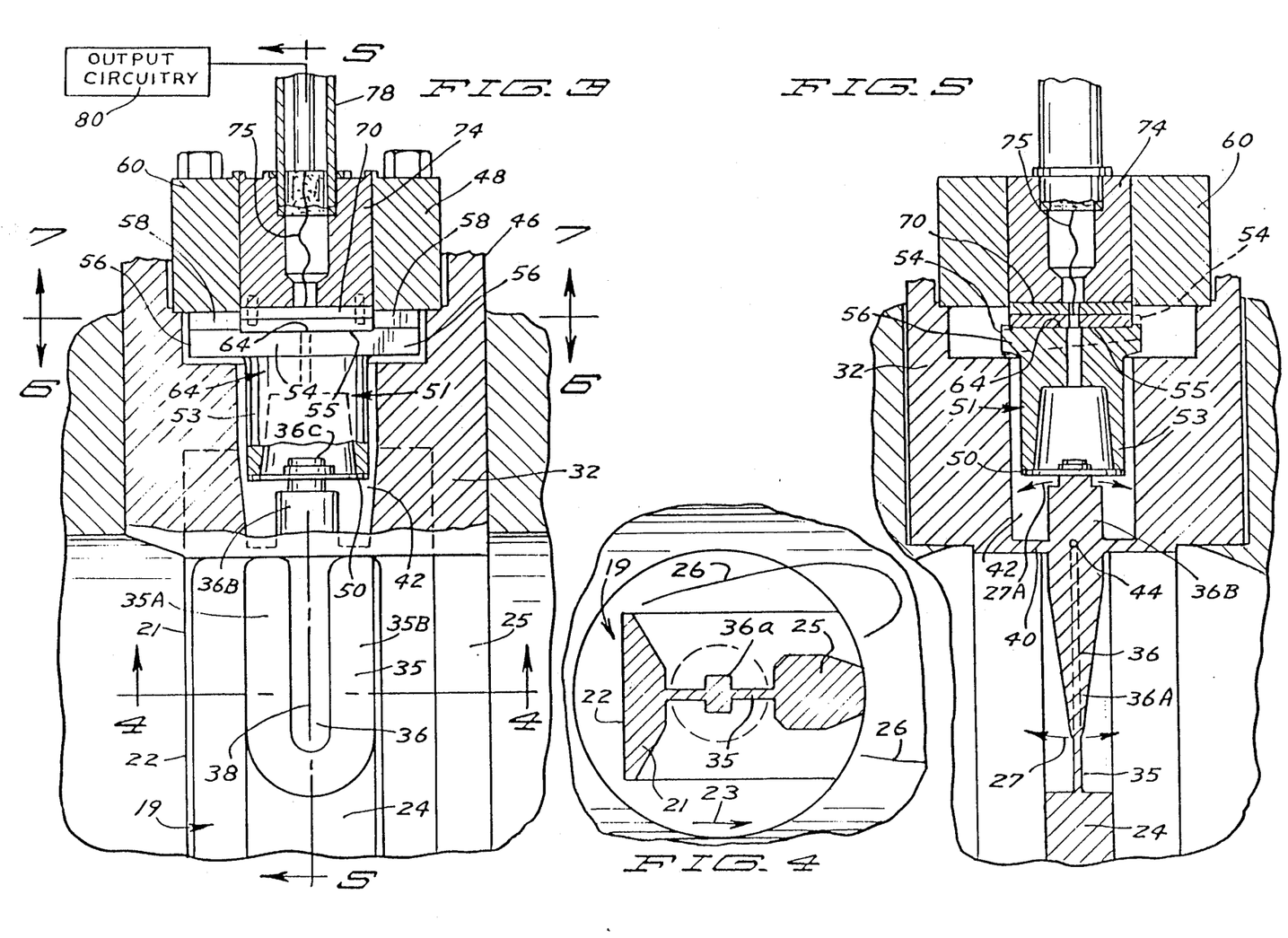
FIG. 3 is an enlarged view taken substantially on the same line as FIG. 2 showing details of the present sensor.
FIG. 4 is a sectional view taken as on line 4—4 in FIG. 3.
FIG. 5 is a sectional view taken as on line 5—5 in FIG. 3.

A housing assembly 20 is part of the flowmeter 10, and is used for mounting a vortex generating bluff body or bar indicated generally at 19 that extends transversely across the conduit opening 14, and as can be seen in FIG. 4, includes a head section 21 that has a forward, generally planar or bluff face 22, which is generally perpendicular to the direction of flow represented by the arrow 23 in FIG. 1. The vortex shedding bar further includes a central web or body portion 24, and a tail 25. The body is designed to provide a series of stable and flow related vortices represented by the lines 26. The vortices are shed alternately from the lateral or side edges of the head 21 of the bar 19. The vortices that are generated switch or alternate, as is well known, from opposite edges of the head 21 at a frequency that is a function of the velocity of fluid flow past the bar 19. The vortices flow downstream past the web or center body portion.

As the vortices switch, the pressure on opposite sides of the central web or body section 24 will alternately be high and low, so that there are differentials in pressure on opposite sides of the central body portion caused by passage of the vortices.

The housing 20 abuts a support plug 30 at a remote end thereof, which is used for supporting the body 19, including the sections 21, 24, and 25 in the flow tube or spool 11, and this plug 30 is held in place with suitable fasteners 31. The housing 20 also includes a head member 32 that is on an opposite side of the spool 11 from the support plug 30, so that the housing is very stably supported in the passageway 14 and thus in the flow stream. Suitable seals 32A, 30A are used for sealing the housing and the spool. Alternatively, welding could be used in place of seals 30A, 32A.

An upper portion 34 of the central web or body 24, adjacent the head 32, is formed into thin sensing diaphragm 35 that is integral with the head 21 of the bar 19 at the leading edge of the diaphragm and is integral with portions of the body along its peripheral edges. Sensing diaphragm 35 is substantially thinner than the main portion of the central web portion 24. As the fluid flows past the head 21 causing vortices to shed, an oscillating differential pressure is imposed across the passage and the sensing diaphragm 35 is affected. The sensing diaphragm 35 is acted upon by the differentials in pressure caused by the vortices 26 (FIG. 4) that alternately shed from the bluff body 19 causing sides of the sensing diaphragm 35 to tend to deflect as indicated by the double arrow 27 in FIG. 5.

A rocking or pivoting sensing beam 36 is integrally coupled to the center portions of the deflecting sensing diaphragm 35, as can be seen in FIGS. 3, 4 and 5, perhaps best. It can be seen that the sensing beam 36 has an elongated or longitudinal axis indicated at 38 that is perpendicular to the direction of fluid flow, and is parallel to the plane of the sensing diaphragm 35. Sensing diaphragm 35 has fore and aft portions 35A and 35B, that couple the sensing beam 36 to the head portion of the body 21 and the tail portion 25 as well as to the central web portion 24 at the lower end of the sensing beam 36. The sensing beam 36 has a first wetted beam portion 36A that is positioned within the conduit passageway 14, and thus subjected to the process fluid, and sensing beam 36 has an isolated beam portion 36B that is on an opposite side of an isolator diaphragm 40 from the sensing diaphragm. The edge of sensing diaphragm 35 is integral with the isolator diaphragm 40 and sensing beam 36 is also integrally formed with the isolator diaphragm 40 formed in the housing 20.

The head 32 of the housing 20 has a chamber indicated at 42 that is on an opposite side of the isolator diaphragm 40 from the spool passageway 14, and thus chamber 42 is isolated by the isolator diaphragm 40 from the fluid flowing in the conduit. Chamber 42 has various sections, but the isolated beam portion 36B is in this isolated chamber 42, and is spaced from the walls thereof, and is supported relative thereto by the isolator diaphragm 40.

The isolator diaphragm 40 is relatively stiff, and forms a pivot for the sensing beam 36, so that the beam portion 36A can move as indicated by double arrow 27A in FIG. 5 as the sensing beam 36 pivots about an axis as shown at 44 in FIGS. 1 and 5. The isolator diaphragm 40 has to be sufficiently strong to withstand the pressure in the conduit opening 14, while the sensing diaphragm 35 has to withstand only the differentials in pressure on opposite sides thereof caused by the generation of vortices from the head 21 of the bluff body or bar 19.

The isolated chamber 42 has an enlarged section 46 in which a motion sensor or sensing means shown generally at 48 is mounted. The motion sensor is coupled to the isolated beam portion 36B of the sensing beam 36. The isolated beam portion 36B of the sensing beam has an upper end that is coupled to an axially flexible diaphragm 50. Diaphragm 50 is flexible along the direction of axis 38, but is stiff enough so it will transmit side-to-side motions. The diaphragm 50 is in turn coupled to a motion transmitting tube 51, which has an outer wall 53, as can be seen in FIG. 3. The lower end of the wall 53 is mechanically connected to the peripheral edges of diaphragm 50. The tube 51 extends upwardly and is coupled to a motion transmitting head 54 (FIG. 3), which is of the shape generally shown in FIG. 6. The head 54 has a center portion 55, and outer edge portions 56, 56. The outer edge portions 56 are hinged with narrow hinge webs 58, to a mounting head 60 of the sensor assembly 48. There are two of the hinge webs 58, as can be seen, and these hinge webs are made so that the motion transmitting head 54 can pivot about an axis which is parallel to the pivot axis 44.

Figures 6, 7, 8:
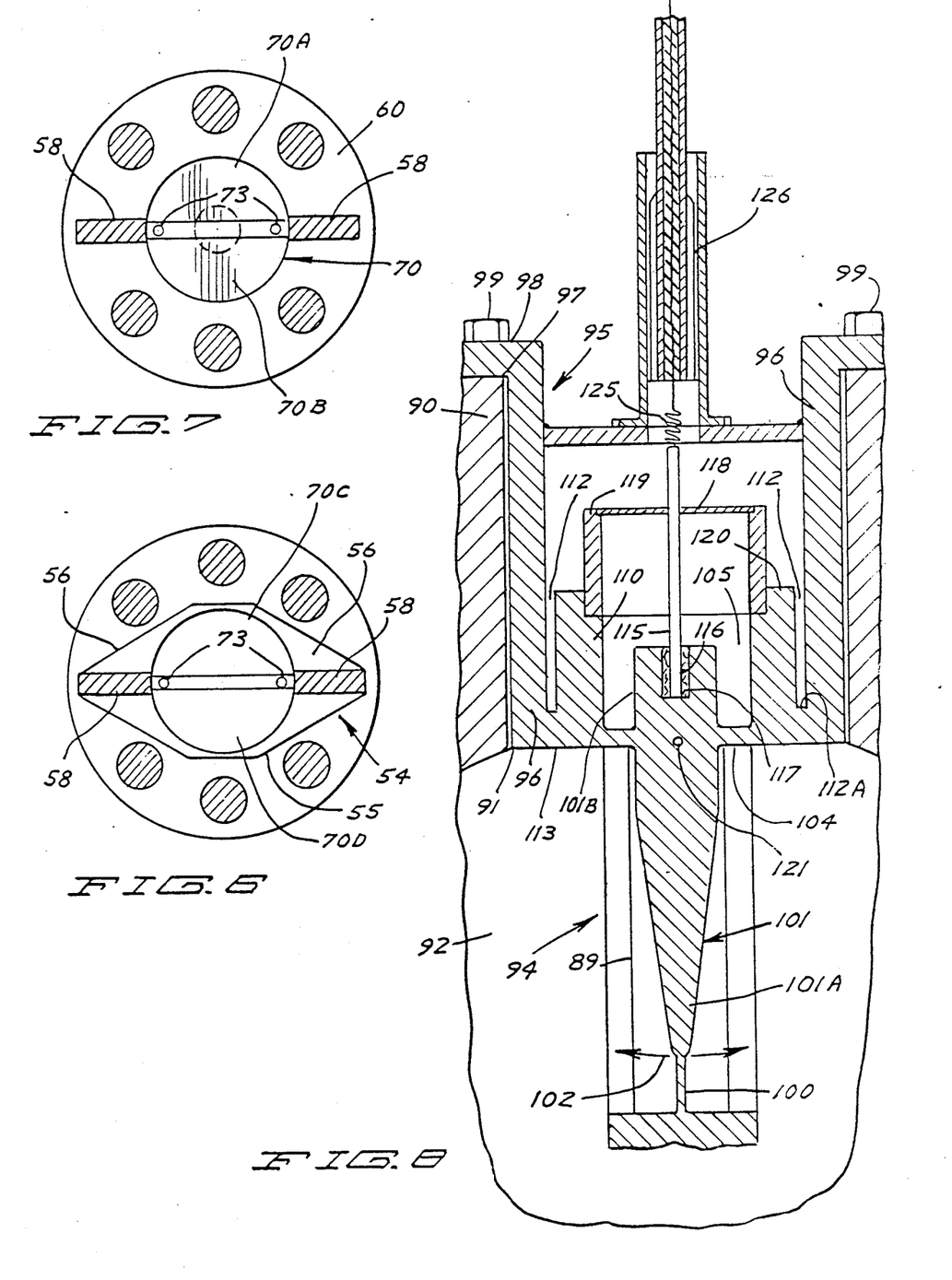
FIG. 6 is a sectional view taken as on line 6—6 in FIG. 3.
FIG. 7 is a sectional view taken as on line 7—7 in FIG. 3.
FIG. 8 is a vertical sectional view of a modified form of the sensor of the present invention showing a different type of mounting.

The rocking of the head 54 about the axis of the hinge webs 58 causes the head 54 to tilt, as is shown greatly exaggerated in dotted lines in FIG. 5. When the head 54 does move the upper surface of the center portion 55 will tilt. The motion of the upper surface 64 of the center portion 55 will tend to change the compression loading of a set of piezoelectric sensing crystal wafers or discs indicated generally at 70. These wafers or discs, as can be seen in FIGS. 6 and 7, comprise two layers, with each layer being two discs of substantially half-circle configuration. The individual sensor discs are shown at 70A and 70B in FIG. 7, and 70C and 70D in FIG. 6. Reaction block 74 is held against the upper surface of discs 70 and retained with respect to mounting head 60. The sensor discs are preloaded under a compressive load sufficient so that the tilting of the surface 64 will further compress the piezoelectric sensor discs on one side of the pivot axis against block 74 while the compressive preload is relieved on the other side of the pivot axis. The compressive preload is sufficiently high so the sensor discs are always under some compressive load during pivoting of the head 54. Locator pins 73 are used to retain the sensor discs 70 in a desired position with respect to the reaction block 74. The motion causes the piezoelectric sensor discs 70 to be loaded in specific direction, depending on the direction of deflection of the isolated beam portion 36B. Surface 64 is directly coupled to the isolated beam portion 36B and deflects as a function of the movement of the rocking sensing beam 36 to provide an electrical output. The four piezoelectric sensor discs are arranged in proper polarity so the outputs of all four discs are added for the total output. The output from the sensor discs can be sensed through leads 75 that are electrically connected to the discs to measure voltage signals from the sensor discs. The voltage signals then are carried to remote sensors, through a suitable feedthrough 78, and are used for providing signal output through suitable circuitry indicated at 80.

The motion sensing means comprising the piezoelectric discs 70 is coupled to the isolated portion 36B of the sensing beam 36 through the diaphragm 50, which is a thin diaphragm with a center hole that is slightly smaller than the diameter of the upper end portion of the isolated beam portion 36B of the sensing beam. When the tube 51 and the sensing means are pushed into place, that is, the parts that are held in place with the cap screws above the isolated beam portion 36B, the diaphragm 50 will slide over the cylindrical end 36C of the isolated beam portion 36B and assume a slightly conical shape around the opening to accomodate the end of the beam portion 36B. This connection is very rigid in the lateral direction, that is perpendicular to the axis 38 of the rocking sensing beam 36, but weak in the axial motion of the sensing beam. The diaphragm connection reduces the axial forces caused by the rocking motion as the sensing beam moves from side-to-side during vortex shedding and also the diaphragm 50 does not transmit axial forces caused by static pressure changes in the line to the sensing discs or wafers 70. The coupling between diaphragm 50 and the beam end 36C permits removal and replacement of the sensing means without opening any seals to the main fluid line. When the sensing means, including tube 51 are removed, the diaphragm 50 involutes and allows removal without damage to the diaphragm or to the upper end 36C of isolated beam portion 36B of the sensing beam.

In FIG. 8, a modified form of the present invention is illustrated, and it operates on the same principles as the forms shown in FIGS. 1-7. The view of FIG. 8 corresponds to that of FIGS. 1 and 5 essentially, but shows a type of a stress isolation mounting utilizable with the present invention. In this form of the invention, a conduit shown fragmentarily at 90 has an opening shown at 91 leading to the interior flow passageway 92 through which fluid is flowing. The fluid is flowing in direction perpendicular to the plane of the sheet of drawings. A vortex sensor assembly indicated generally at 94 is mounted in the opening 91 and extends into the flow passageway 92. The vortex sensor assembly 94 is part of a vortex shedding bar 89. The shedding bar 89 has a head portion positioned in the same manner as the head of the vortex shedding bar shown in FIG. 4, for example. In this form of the invention, a housing 95 includes a cylindrical sleeve 96 made from a unitary block of material. The sleeve 96 slips into the opening 91, and the bar 89 that is used for forming the vortices can be made as an integral part of sleeve 96, from the same block of material. As shown, the sleeve 95 has an outer flange 98 that is supported on a surface 97 of the conduit. The outer surface of sleeve 96 is spaced from the surfaces defining the opening 91. The flange 98 can be held in place very rigidly with capscrews shown at 99.

A sensing diaphragm assembly 100 is formed in the same manner as shown before, and a rocking sensing beam 101 is integrally formed with the diaphragm assembly 100, so that it is responsive to differentials in pressure on the sensing diaphragm assembly 100 to tend to move back and forth as indicated by the double arrow 102. The sensing beam 101 is also mounted to a rigid isolator diaphragm 104 that is at an inner end of the sleeve 96, the diaphragm 104 and the sleeve 96 form an isolated chamber 105 on the upper side of the isolator diaphragm. The sensing beam 101 has a sensing beam portion 101A and an isolated beam portion 101B on the opposite side of the diaphragm 104 from the passageway 92 carrying the process fluid.

The isolated chamber 105 is surrounded by an inner sleeve 110 that is separated from the cylindrical sleeve 96 with a stress relief annular isolator groove 112, which has an inner end surface 112A spaced upwardly from the bottom surface 113 of the sleeve 96 a greater distance than the thickness of the diaphragm 104. The chamber 105 is isolated from the conduit passageway 92, and thus from the corrosive fluids that may be carried in the conduit, and the isolated beam portion 101B of the rocking sensing beam is suitably coupled to a bimorph (piezoelectric) bending beam 115. The coupling can comprise an interface surface defined by a recess 116 holding the end of the bimorph beam 115 in place with suitable connection means such as a spring slip fit, or as shown in resin filling 117 that fills the recess and fixes the parts together. The bimorph beam 115 is supported on a diaphragm 118 at its other end, and the diaphragm 118 is supported on a ring 119 that in turn is fixed to the upper end 120 of the stress isolated sleeve 110. The diaphragm 118 is bonded to the beam 115 at their junction. The bimorph beam 115 will bend to provide an output electrical signal when the isolated beam section 101B moves as the sensing beam pivots in the direction as indicated by the arrows 102 at its lower end, the upper end will also move because the sensing beam will pivot with respect to the isolator diaphragm about a pivot axis shown at 121. This will be in the center of the rigid isolator diaphragm 104, and the motion of the isolated beam section 101B, that includes the coupling surfaces to the sensing means comprising the bimorph piezoelectric beam 115, will move, causing bending of the bimorph beam and providing an output along suitable leads 125, that can couple to a feedthrough assembly 126 that provide the necessary electrical connections for sensing the bimorph beam output at remote circuitry. The diaphragm 118 is flexible in axial direction of the sensing beam and reduces the effect of axial movement of the isolated beam section 101B on the bimorph output as the sensing beam 101 pivots in use.

Because the vortex sensor assembly 94 is mounted with the flange 97 attached to the conduit, and the vortex shedding bar and sensing means are isolated by groove 112 the mounting stresses for mounting housing 95 do not directly affect the rigid isolator diaphragm 104. Thus, the mounting stresses will not unbalance the half portions of the rigid isolator diaphragm 104 and the pivoting of the sensing beam will be symmetrical about its axis 121. The isolator diaphragm 104 can be trimmed to be thinner on one side or the other and thus balanced and will still provide the necessary support for the rocking sensing beam 101. Very high values of the common mode rejection ratio can be obtained because of the isolation of the sensor from mounting stresses. The type of sensing means used is not particularly critical, and the bimorph-type beam sensing means shown does provide an adequate frequency signal output. Here, too, the sensing means can be easily removed and replaced if the bimorph beam 115 is coupled to the surfaces of the isolated portion 101B of the sensing beam by other than epoxy, such as example with a slight interference fit, or with a mechanical spring mounting.

Figures 9, 10, 11:
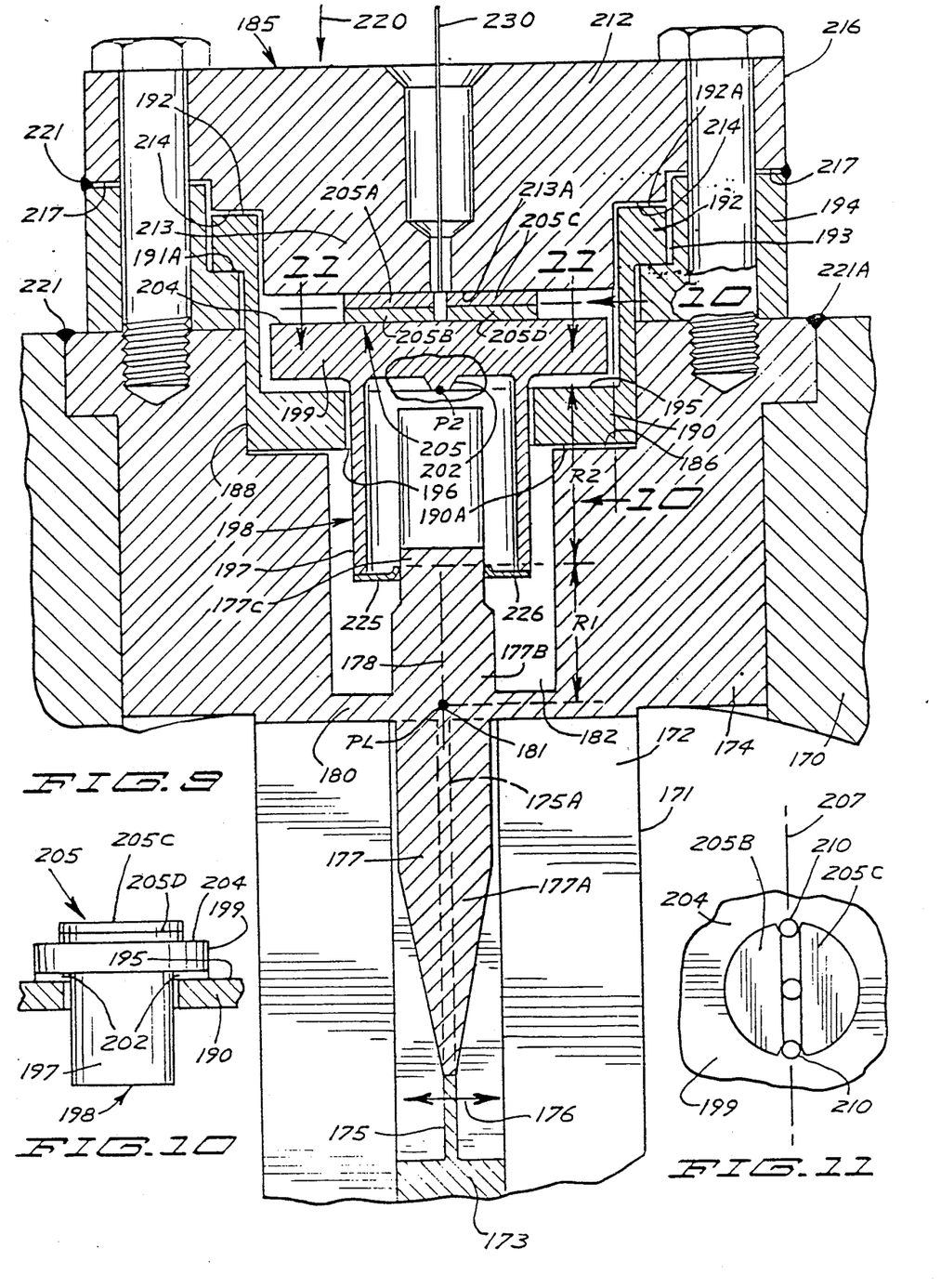
FIG. 9 is a vertical sectional view of a further modified form of the present invention showing an arrangement to reduce acceleration sensitivity.
FIG. 10 is a side view of a motion coupling member for transferring motion from a rocking beam to a sensor taken on line 10—10 in FIG. 9.
FIG. 11 is a view of a sensor taken on line 11—11 in FIG. 9.

In FIGS. 9, 10 and 11, a modified form of the sensor is shown which provides for structure that compensates for accelerations, such as that caused by vibration in the conduit in which the flowmeter is mounted, and has counterbalanced masses about the axes of pivot of the rocking beam, and also about the axis of the coupling link from the rocking beam to the sensor elements.

In FIG. 9, the cross section is essentially along the same plane as that shown in FIGS. 1 and 5 and comprises a vortex flowmeter housing 170 that fits within a conduit, as previously shown. A vortex generating bar assembly or bluff body 171 is shown only fragmentarily, and is illustrated downstream from a vortex generating head section 172 that corresponds to the head section 21. Thus, FIG. 9 is taken looking upstream along the flow conduit. In this case, there is a central body portion 173 that is shown in section in FIG. 9. The cross section of the body 173 is essentially the same as that shown in FIG. 4, with the head 172 being in the position of the head 21 in FIG. 4. The bluff body 171 is supported in a support head 174 that is mounted on the meter housing 170 in a suitable manner. The upper portion of the central body 173, that is, the portion adjacent to the support head 174 is formed to have a thin sensing diaphragm indicated generally at 175 therein, corresponding to the diaphragm 35.

Diaphragm 175 comprises a sensing diaphragm that will tend to move back and forth as indicated by the double arrow 176 when vortices generated by the bluff body 171 cause pressure differentials on opposite sides of the sensing diaphragm 175. A rocking or pivoting sensing beam 177 is integrally coupled to the center portions of the sensing diaphragm 175. The rocking beam 177 is centered on the sensing diaphragm 175 and has an elongated central longitudinal axis 178 that bisects the sensing diaphragm. The sensing diaphragm has a portion 175A that is illustrated in dotted lines, which joins the rocking beam 177 to the vortex generating head 172, body 173 and tail (similar to tail 25 of FIG. 4) as previously illustrated in FIGS. 4 and 5 for example.

The rocking beam 177 has a first wetted portion 177A in the flow conduit, and a second isolated beam portion 177B. An isolator diaphragm 180 is integrally formed with the rocking beam 177, and divides the isolated portion 177B from the wetted beam portion 177A. The wetted portion is in contact with the fluid flow. The isolator diaphragm 180 mounts the rocking beam so that the rocking beam can pivot back and forth about a pivot axis represented by the dot 181, that is perpendicular to the cross-sectional plane of FIG. 9.

The isolator diaphragm 180 forms an interior chamber 182 in the beam support head 174. The isolated portion 177B of the rocking beam is positioned in chamber 182. A sensor assembly 185 is also positioned in the outer portion of chamber 182, and as can be seen, the chamber 182 expands or becomes larger in diameter in stages toward the outer or open end thereof. An interior shoulder 186 in chamber 182 forms a larger diameter bore at the open end of the chamber, and the sensor assembly 185 has a shoulder that overlies the surface 186. The sensor assembly further has an outer cap assembly 188 that is used for bolts that clamp the sensor support assembly into the support head 174.

The sensor assembly 185 is made to provide for transferring the side-to-side rocking motion of the isolated portion 177B of the rocking beam 177 to the actual sensor elements, so that the rocking motion will generate a signal indicating the frequency of vibration or rocking of the beam 177 about its pivot axis 181. The sensor assembly 185 includes a tubular support sleeve 190, which has a lower surface 190A that overlies but is slightly spaced from the surface 186. The support sleeve 190 extends toward the open end of bore 188 and has an outer rim 192 that fits within a bore portion 193 of a ring or sleeve 194 forming part of the sensor assembly.

The sleeve 190 also has an interior bore forming an outwardly facing shoulder surface 195 that forms an annular surface around a central opening 196 in the end of support sleeve 190. The central opening 196 is of size so a motion coupling sleeve 197 will pass therethrough. The motion coupling sleeve 197 is part of a rocking motion transmitting assembly 198 that includes the sleeve 197 and a rocking head 199 (see FIG. 10 as well). The head 199 is a circular head in plan view, and the sleeve 197 is centered on the central axis of the head, which coincides with the axis 178 of the beam when the sensor assembly is mounted on support head 174. The lower surface of head 199 has a pair of pivot ribs 202 thereon aligned on opposite sides of sleeve 197, as can be seen in the broken away portion of FIG. 9 and also as seen in FIG. 10. The pivot ribs 202 extend outwardly from the wall of the tube 197 and have rounded bottom surfaces to form a pivoting or rocking support so that the head 199 can be tilted about a pivot axis that is on the lower edge of the ribs and which rests along the surface 195. The ribs 202 and the motion transmitting or coupling assembly 198 are thus pivotably mounted on an axis parallel to axis 181.

The head 199 has a planar upper surface 204 which is parallel to the pivot axis underneath the ribs 202, and thus parallel to the surface 195, and is used to support four piezoelectric sensing crystals forming a sensor indicated generally at 205. The sensor includes two stacked layers of sensor discs or crystals, comprising discs 205A, 205B, 205C and 205D as shown in FIG. 9.

The discs are shown in plan view in FIG. 11, and as can be seen there is a pair of stacked discs on each side of the bisecting plane of the diaphragm 175, which plane is represented by the line 207 in FIG. 11. The pairs of discs are spaced apart in the center of the head 199. Suitable pins 210 are provided in the head 199, for locating the discs 205A–205D, and the discs are held under compression against the surface 204 of head 199 through the use of a cap 212 that has an end boss portion 213 which fits within the inner opening of the sleeve 190. The cap 212 has a shoulder surface 214 surrounding boss 213. The shoulder surface 214 overlies the rim 192 of tube 190. The surface 214 is spaced from the upper surface 192A so that there is a slight gap between the surfaces.

The cap 212 further has an outer peripheral rim 216 that overlies the support ring 194, and the rim 216 has a surface 217 that overlies the upper surface of the ring 194 and which is normally spaced therefrom. The cap 212 therefore can be loaded to cause the undersurface 213A of boss 213 to bear against the piezoelectric sensor discs 205 and force these discs to be compressed against the surface 204 of the head 199, and in turn load the ribs 202 against the surface 195.

In assembly, the surface 190A is placed on a support, and the motion transmitting assembly 198 is placed with ribs 202 against the surface 195. The piezoelectric sensor discs 205 are put into position on surface 204 using the pins 210; the sleeve 190 is placed within the ring 194, and the cap 212 is placed over the discs 205. A compressive load is then provided to the upper surface of the cap 212 as indicated by the arrow 220, which is resisted by the supporting load on the surface 190A. The wafers or crystals 205 are loaded under compression to a desired level, and the cap 212 and support ring 194 are welded together at the periphery as shown by the weld 221. The surfaces at 217 may still be spaced, and there still will be a gap between surfaces 214 and 192A, but the rim 192 will be supported under load on the interior shoulder surface 191A that is defined in the ring 194. Thus, the piezoelectric sensor discs 205 are preloaded a desired amount under compression to insure that they will operate satisfactorily in use. The assembly 195 is placed on support head 174 for use and when held in place there will be a gap between surfaces 190A and 186.

The construction of sensor assembly 185 also permits compensation for differentials in coefficients of thermal expansion between the piezoelectric sensor discs 205 and the support sleeves and rings which generally are made of stainless steel, as will be explained.

The lower end of the motion coupling tube 197 has a thin diaphragm 225 thereon which is fixed at its outer periphery as shown at 226 to the lower edge of the tube 197. The diaphragm has a central opening of slightly smaller diameter than the cylindrical upper head 177C of the isolated portion 177B of the rocking beam 177. As previously explained, when the sensing assembly 195 is put into position on the support head 174, the diaphragm 225 will deform slightly around its opening to provide a friction coupling between the diaphragm 225 and the rocking beam.

In this form of the invention, the upper end portion 177C of the rocking beam has a selected size mass 177D above the diaphragm 225, to provide for a counterweight for balancing the lower wetted portion 177A of the rocking beam, that is below the pivot 181. It can readily be seen that by selecting the mass of portion 177D, which is within the motion transmitting or coupling tube 197, the lower wetted portion 177A can be counterbalanced precisely to compensate for the effects of acceleration forces on the rocking beam.

Likewise, the mass of motion transmitting or coupling assembly 198 can be compensated by selecting the mass of the head member 199 on opposite sides of the pivot axis defined by the lower edge of the ribs 202 from the coupling tube 197.

The mass of the tube 197, which is below the pivot axis on ribs 202, has to be compensated by the mass of the head 199 above this pivot axis. Because the pivot axis is kept below the sensors by using the ribs 202 on the lower size of the head 199, external weights or added weights are not necessary, because the unit can be self-balancing, by selecting the mass of the head 199 properly.

The operation of this form of the invention is the same insofar as sensing is concerned, and suitable leads 230 are connected to the piezoelectric discs or crystals 205A–205D to provide an electrical output when the piezoelectric discs are loaded under greater compression on one side of the pivot axis formed by the ribs 202 and reduced in compressive load on the opposite side of this pivot axis. The piezoelectric discs 205A–205D are selected in polarity so that their outputs are additive, as previously explained.

Because the vortex sensors of the present invention must be operated in widely differing temperatures, problems in differential thermal expansion between the compression loaded parts can occur. The piezoelectric crystal material has a very low coefficient of expansion, for example, in the range of one part per million per degree F of temperature change, while the stainless steel tubes and sleeves mounting the crystals have a substantially higher thermal expansion coefficient. However, different stainless steels can be obtained which have different coefficients of expansion from other types, but all have thermal expansion coefficients greater than the coefficient of expansion of piezoelectric materials.

In use then, under a wide range of varying temperatures, it is possible that differential expansion would reduce the initial compressive load on the piezoelectric discs or crystals sufficiently to cause problems. It should be noted again that the sensor discs are intended to always be under some compression, even when maximum pivoting of the rocking beam is encountered.

In the form of the invention shown in FIG. 9, this effect can be at least partially compensated by making the sleeve 190 of a material that has a lower coefficient of expansion than the cap 212 and head 199 of the motion transmitting assembly 198 and selecting the effective axial length of the sleeve to be at the proper ratio to the thickness of the sensor discs. The boss 213 of cap 212 expands at one rate under increasing temperatures and the boss elongation or shortening along its axis will be proportional to the length of the boss. The dimensional change of support sleeve 190 along its axis will be different and will be proportional to its length. The axis length of sleeve 190 between surfaces 191A and 195 will be selected to offset or compensate for the lessor expansion of the piezoelectric discs or crystals 205. The dimension can be selected to maintain the preload on the discs at the design level. The cap 212 is selected to have a higher coefficient of expansion than the sleeve 190 to achieve the compensation. The discs 205 have a substantially lower coefficient. The ring 194 and motion transmitting assembly 198 are selected to be the same material as cap 212.

The head member 174 can be welded into the flowmeter housing 170, and because there is a weld 221A that holds the unit in place, there are no seals that fail in the unit. The sensor assembly 185 can be removed for service merely by removing the capscrews that thread the sensor assembly 185 into the support head 174, and slipping the diaphragm 225 off the cylindrical portion 177C of the rocking beam, which is the isolated, non-wetted portion of the rocking beam.

At low to zero flow rates, the present sensor provides an adequate output without great sensitivity to variations in static pressure. Static pressure variations are noticeable at low flow rates because the static pressure changes can appear as a pulse in the line, such as for example near a pump, where significant pressure pulsations are generated. The double diaphragm prior art devices exhibit a greater likelihood for providing an erroneous indication under such conditions than the present single diaphragm sensor does. If the flowmeter is in a branch line, with a very low flow and the main line has a high flow rate, there can be substantial effects from static pressure changes in relation to the differential pressure.

The rigid isolator diaphragms used are very stiff in the axial direction of the sensing beam, since the isolator diaphragm is supported by the sensing diaphragm at the junction of the two. The rigid isolator diaphragm thus responds as if it were actually two separate diaphragms (each of them a half circle) when analyzed for common mode pressure effects on such isolator diaphragm. The much greater rigidity of the isolator diaphragm perpendicular to its plane as compared to the sensing diaphragm, means that the isolator diaphragm will be substantially unaffected by differentials in pressure caused by vortex formation as compared to the sensing diaphragm. There will be some motion introduced into the isolator diaphragm because of static pressure changes, but because of the mechanical advantage of the effect on the rocking sensing beam through the sensing diaphragm as opposed to the effect on the isolator diaphragm, the isolator diaphragm motion problems are reduced substantially and do not form a significant drawback. The effect of stiffness and area of the isolator diaphragm can be modified by grinding on one half or the other of the isolator diaphragm to thin one side of the isolator diaphragm and balance the effect of area and stiffness ratios. The isolator diaphragm halves thus can be made to match quite closely, and unwanted different motions responsive to static pressure variations of the two different sides are avoided.

The sensing diaphragm can be very thin, because it only has to survive the differential pressures caused by vortex generation. The isolator diaphragm, on the other hand, has to withstand the static pressure of the line in which it is placed. The isolator diaphragm is thus smaller and thicker than the sensing diaphragm.

Another important advantage of the present invention is that the sensor will operate at high temperatures. Using piezoelectric crystals, for example, 700° to 1000° F. can be tolerated, and because the vortex shedding bar and the rocking sensing beam do not have to be welded, (the units can be made in one piece) they are not subject to strength reduction or increased corrosion caused by welds. The number of materials used can be reduced, simplifying construction. The also is of advantage when considering high temperature operation.

The rocking beam sensor can be a replaceable module to couple to the isolator and sensing diaphragm if desired, and this may have some advantage in some circumstances, but would cost more if the problem of sealing the interface of the rocking beam and the center body portion 24, the shedding bar, and the diaphragm 25 is difficult.

Piezoelectric crystals or other detection means sensitive to compression, bending, or shear can be used with the invention.

Although the present invention has been described with reference to preferred embodiments, workers skilled in the art will recognize that changes may be made in form and detail without departing from the spirit and scope of the invention.

When the vortex flowmeter is rotationally vibrated, the rocking beam and the sensor assembly each tend to vibrate rotationally with respect to the housing. This can produce undesirable noise in the sensor output. The effects of rotational vibration can, however, be reduced, by selecting mechanical parameters of the sensor to provide cancellation of forces. The rocking beam vibrates about its pivotal axis P1, exerting a first force F1 on the coupling between the rocking beam and the sensor assembly. The sensor assembly vibrates about its pivotal axis P2, exerting a second force F2 on the coupling between the rocking beam and the sensor assembly. If the forces F1 and F2 are balanced to be substantially equal and opposite, however, noise at the sensor output is reduced. The force F1 is proportional to the rotational moment of inertia of the rocking beam divided by the moment arm R1 between the pivotal axis P1 and the coupling axis P3. The force F2 is proportional to the rotational moment of inertia of the sensor assembly divided by the moment arm R2 between the pivotal axis P2 and the coupling axis P3. The lengths of the moment arms R1, R2 can be adjusted by changes to mechanical dimensions to balance the forces. As explained above, the rocking beam and the sensor assembly can also be balanced for translational (non-rotational) vibration by adding or removing material at selected locations on the rocking beam or the sensor assembly. Compensation for both rotational and translational vibration of the flowmeter is thus achieved by selecting the amounts of material and spacings between pivotal axes P1, P2 and the coupling axis P3.

What is claimed is:

1. An apparatus providing an output indicative of a flow of fluid, comprising:
   a housing which includes a body for inducing vortices in the fluid as a function of the flow, the housing having an isolation chamber therein;
   a thin sensing diaphragm formed in the body and being supported at peripheral portions on the body and open to the fluid for deflecting laterally responsive to the vortices formed by the body;
   a beam coupled to the sensing diaphragm to move laterally therewith and extending to an isolated beam surface positioned in the isolation chamber for transferring deflection of the sensing diaphragm to the isolated beam surface, the sensing diaphragm extending both upstream and downstream from the beam;
   sensing means coupled to the isolated beam surface for sensing deflection thereof and for providing the output indicative of the flow; and
   an isolator diaphragm formed in the housing and sealingly joined to the beam for isolating the isolation chamber from the fluid such that the sensing means are not in contact with the fluid.

2. The apparatus of claim 1 wherein the sensing diaphragm is joined to the isolator diaphragm.

3. The apparatus of claim 2 wherein the isolator diaphragm and the sensing diaphragm have planes substantially perpendicular to each other the isolator diaphragm forming one wall portion of the isolation chamber.

4. The apparatus of claim 1 wherein the beam is integrally joined to the isolator diaphragm and pivots with the isolator diaphragm.

5. The apparatus of claim 4 wherein the isolated beam surface is deflected by rocking the beam about a pivotal joint formed by the isolator diaphragm as the beam is deflected by the sensing diaphragm.

6. The apparatus of claim 5 wherein the isolator diaphragm is movable as a function of a common mode pressure in the fluid and the sensing means is mounted to be substantially insensitive to such movement.

7. The apparatus of claim 4 wherein the beam has first and second portions on opposite sides of the isolator diaphragm, the first and second portions being selected to have substantially the same mass moment about the pivot to compensate for acceleration forces tending to rotate the beam about its pivot.

8. The apparatus of claim 1 wherein said sensing diaphragm has a plane that is generally parallel to the direction of flow of fluid and is positioned to substantially bisect the body for inducing vortices.

9. The apparatus of claim 2 wherein the isolator diaphragm is integrally formed with the housing and forms one wall of the isolation chamber.

10. An apparatus providing an output indicative of a flow of fluid, comprising;
a housing,
a body mounted on the housing for projecting into the flow of fluid and having a head for inducing vortices in the fluid as a function of the flow, the housing having wall means defining an isolation chamber therein which is fluidly isolated from the fluid flow, the wall means including a portion comprising an isolator diaphragm;
a single sensing diaphragm formed in the body downstream of the head of the body and mounted for deflecting responsive to vortices formed by the head;
beam means integral with the isolator diaphragm and having a first beam portion joined to the sensing diaphragm to transfer deflections of the sensing diaphragm to a second beam portion in the isolation chamber and aligned with the first beam portion, the second beam portion having a surface in the isolation chamber;
sensing means isolated from the fluid flow for sensing deflection of the second beam portion and for providing the output indicative of flow of fluid past the body; and
means for coupling the sensing means to the second beam portion comprising a flexible diaphragm that has a plane generally parallel to the plane of the isolator diaphragm, and which flexible diaphragm does not substantially resist movement along an axis generally perpendicular to the plane of the isolator diaphragm.

11. The apparatus of claim 10 wherein the isolator diaphragm deflects perpendicular to its plane as a function of a common mode pressure in the fluid and the sensing means is coupled to the surface through a coupling which transmits lateral motions and which does not carry substantial loads in direction perpendicular to the plane of the isolator diaphragm.

12. The apparatus of claim 10 wherein said beam means and said isolator diaphragm are made from a unitary piece of material, and are integrally joined to said sensing diaphragm, said isolator diaphragm and said sensing diaphragm having planes that are substantially perpendicular to each other.

13. The apparatus as specified in claim 10 wherein the surface is on a second beam portion aligned with the first beam portion and integral with the isolator diaphragm, and means for coupling the sensing means to the second beam portion comprising a flexible diaphragm that has a plane generally parallel to the plane of the isolator diaphragm, and which flexible diaphragm does not substantially resist movement along an axis generally perpendicular to the plane of the isolator diaphragm.

14. The apparatus of claim 10 wherein said sensing means comprises piezoelectric crystal means mounted at a location spaced from the second beam portion, and coupling means comprising a pivoting lever having a surface portion and being coupled to said second beam portion said pivoting lever moving when the second beam portion moves and driving the surface portion to tend to change loading on the piezoelectric crystals on opposite sides of the pivot axis of said pivoting lever.

15. The apparatus as specified in claim 14 wherein said sensing means comprises at least first, second and third portions, said first portion comprising a support, said second portion comprising the pivoting lever pivoting relative to said support, and said third portion comprising a cap member retained relative to said first portion, said piezoelectric crystal means being loaded under compression between said second portion and said third portion, when the first and third portions are compressed together.

16. The apparatus as specified in claim 15 wherein said second portion has means for pivotally mounting the second portion relative to the first portion, and the pivot mounting being arranged so that upon pivoting the loading upon the piezoelectric crystal means changes.

17. A vortex beam flow sensor for providing indications of differential pressures generated by a vortex shedding bar in a fluid flow stream, comprising:
a thin single planar sensing diaphragm supported on its periphery by the vortex shedding bar and having a plane generally parallel to the direction of flow of said flow stream and deflecting laterally with respect to the direction of movement of the vortices;
means positioning said sensing diaphragm with respect to said vortex shedding bar so as to be deflected by vortices formed by the vortex shedding bar, said sensing diaphragm having a beam coupled thereto to cause movement of the beam as the sensing diaphragm deflects laterally, the beam substantially bisecting the sensing diaphragm, said beam having an axis parallel to the plane of the sensing diaphragm and generally perpendicular to the direction of flow of fluid to be sensed;
a stiff isolator diaphragm having a plane generally perpendicular to the sensing diaphragm and mounting said beam, said beam having a portion extending on an opposite side of said isolator diaphragm from the sensing diaphragm into an isolated chamber formed in part by said isolator diaphragm, the isolator diaphragm bisected by the sensing diaphragm such that movement of the isolator diaphragm due to static pressure is reduced;

wall means coupled to said isolator diaphragm to permit mounting both the diaphragms and the beam relative to a conduit having fluid flow to be sensed so that the isolated chamber is not in contact with such flowing fluid; and sensing means in said isolated chamber and accessible from the exterior of the wall means without disturbing the flow of fluid being sensed, said sensing means including means movable with the portion of the beam in the isolated chamber to provide output indications indicating the movement of said beam from a reference position.

18. The apparatus of claim 17 wherein the beam portion on the opposite side of said isolated diaphragm in the isolated chamber is selected to have a mass that counterbalances the portions of said beam on the opposite side of said isolator diaphragm when the beam pivots.

19. The apparatus of claim 17 wherein said means movable with the beam portion in the isolated chamber comprises a thin diaphragm having a central opening, said beam portion in the isolated chamber having an end portion of slightly smaller size than the opening in said thin diaphragm being of material that can be forced down onto said end portion and deformed to frictionally fit around and engage the end portion to provide a connection for a motion drive generally in the plane of the thin diaphragm, the thin diaphragm easily moving in direction along a longitudinal axis of the beam.

20. The apparatus of claim 17 wherein said sensing and isolator diaphragms are an integral part of the vortex shedding bar.

21. The apparatus of claim 17 wherein the beam and the sensing means each are constructed to generate balanced forces to reduce sensitivity to undesired translational vibration, and the beam and sensing means are coupled together and balanced to provide reduced sensitivity to undesired rotational vibration.

22. A vortex beam flow sensor for providing indications of differential pressures generated by a vortex shedding bar in a fluid flow stream, comprising:

a sensing diaphragm having a plane generally parallel to the direction of flow of said flow stream and activated laterally with respect to the direction of movement of the vortices;

means positioning said sensing diaphragm with respect to said vortex shedding bar, so as to be deflected by vortices formed by the vortex shedding bar, said sensing diaphragm being a single planar diaphragm and having a beam coupled thereto to cause movement of the beam as the sensing diaphragm deflects laterally, substantially bisecting the sensing diaphragm, said beam having an axis parallel to the plane of the sensing diaphragm and generally perpendicular to the direction of flow of fluid to be sensed;

an isolator diaphragm having a plane generally perpendicular to the sensing diaphragm and mounting said beam, said beam having a portion extending on an opposite side of said isolator diaphragm into an isolated chamber formed in part by said isolator diaphragm;

wall means coupled to the isolator diaphragm to permit mounting both the diaphragm and the beam relative to a conduit having fluid flow to be sensed, wherein the wall means for mounting said isolator diaphragm defines a housing and includes a support wall defined by a stress isolation groove surrounding the isolator diaphragm and separating the support wall from main portions of the housing supporting said isolator beam to isolate the isolator diaphragm from stresses on the main portions of the housing caused by mounting the housing with respect to the conduit; and sensing means in said isolated chamber and accessible from the exterior of the wall means without disturbing the flow of fluid being sensed, said sensing means including means movable with the portion of the beam in the isolated chamber to provide output indications indicating the movement of said beam from a reference position.

23. An apparatus providing an output indicative of a flow of fluid, comprising:

a housing which includes a body for inducing vortices in the fluid as a function of the flow, the housing having an isolation chamber therein;

a sensing diaphragm formed in the body and coupled to the fluid for deflecting responsive to the vortices formed by the body;

a beam joined to the sensing diaphragm and extending to an isolated beam surface positioned in the isolation chamber for transferring deflection of the sensing diaphragm to the isolated beam surface;

motion sensing means formed to the isolated beam surface for sensing deflection thereof and for providing the output indicative of the flow;

an isolator diaphragm having a plane perpendicular to the sensing diaphragm and being formed in the housing and sealingly joined to the sensing diaphragm and the beam, the isolator diaphragm forming one wall portion of the isolation chamber for isolating the isolation chamber from the fluid such that the sensing means is not in contact with the fluid;

said motion sensing means being mounted on said housing on an opposite side of the isolator diaphragm from the sensing diaphragm, said beam having its isolated beam surface on the same side of the isolator diaphragm as the motion sensing means, said motion sensing means comprising means coupled to said isolated beam surface and moving with said isolated beam surface as the motion sensing diaphragm deflects, and piezoelectric means forming a portion of the motion sensing means for providing an output responsive to the movement of the isolated beam surface, said isolated beam surface comprising a surface generally perpendicular to the plane of the sensing diaphragm; and means to mount said isolating beam surface so that it moves upon movement of the beam to tend to change compressive loads on the piezoelectric sensing means.

24. The apparatus as specified in claim 23 wherein said first means coupled to the isolated beam surface comprises a pivoting member which changes the load on the piezoelectric means, and wherein said pivoting member has portions on opposite sides of its pivot to balance the accelerative loads tending to move the means coupled to the isolated beam surface about its pivot.

25. The apparatus of claim 23 wherein said beam comprises a rocking beam integrally attached to the sensing diaphragm, and supported in the housing for pivotal movement about an axis generally parallel to the plane of the sensing diaphragm at said isolator diaphragm, said rocking beam having an isolated beam portion on an opposite side of the isolator diaphragm from the sensing diaphragm, a tilting member mounted in said housing isolated from said sensing diaphragm and spaced from the isolated beam portion said tilting beam being hingeable about an axis generally parallel to the plane of the sensing diaphragm and aligned therewith, and means to couple the tilting member and the beam portion comprising a thin diaphragm having an opening in the center, and an outer periphery portion that is joined to the tilting member in spaced locations on opposite sides of the isolated beam portion, said isolated beam portion being generally cylindrical, and said opening in the thin diaphragm being of a smaller diameter than the size of the isolated beam portion whereby when the sensor is assembled the thin diaphragm is pushed over the isolated beam portion to form a press fit between the thin diaphragm and the isolated beam portion for transmitting motions to the tilting member.

26. The apparatus of claim 23 wherein said beam comprises a rocking beam integrally formed with both the isolator diaphragm and the sensing diaphragm and rocking beam having a portion on the opposite side of the isolator diaphragm from the sensing diaphragm, the isolator diaphragm being so constructed to permit the rocking beam to pivot with respect thereto in response to deflecting movement of the sensing diaphragm.

27. The apparatus of claim 26 and a coupling diaphragm in the isolation chamber coupled between the rocking beam portion and the sensing means, the coupling diaphragm being flexible in direction parallel to the plane of the sensing diaphragm.

* * * * *